United States Patent Office 3,407,453
Patented Oct. 29, 1968

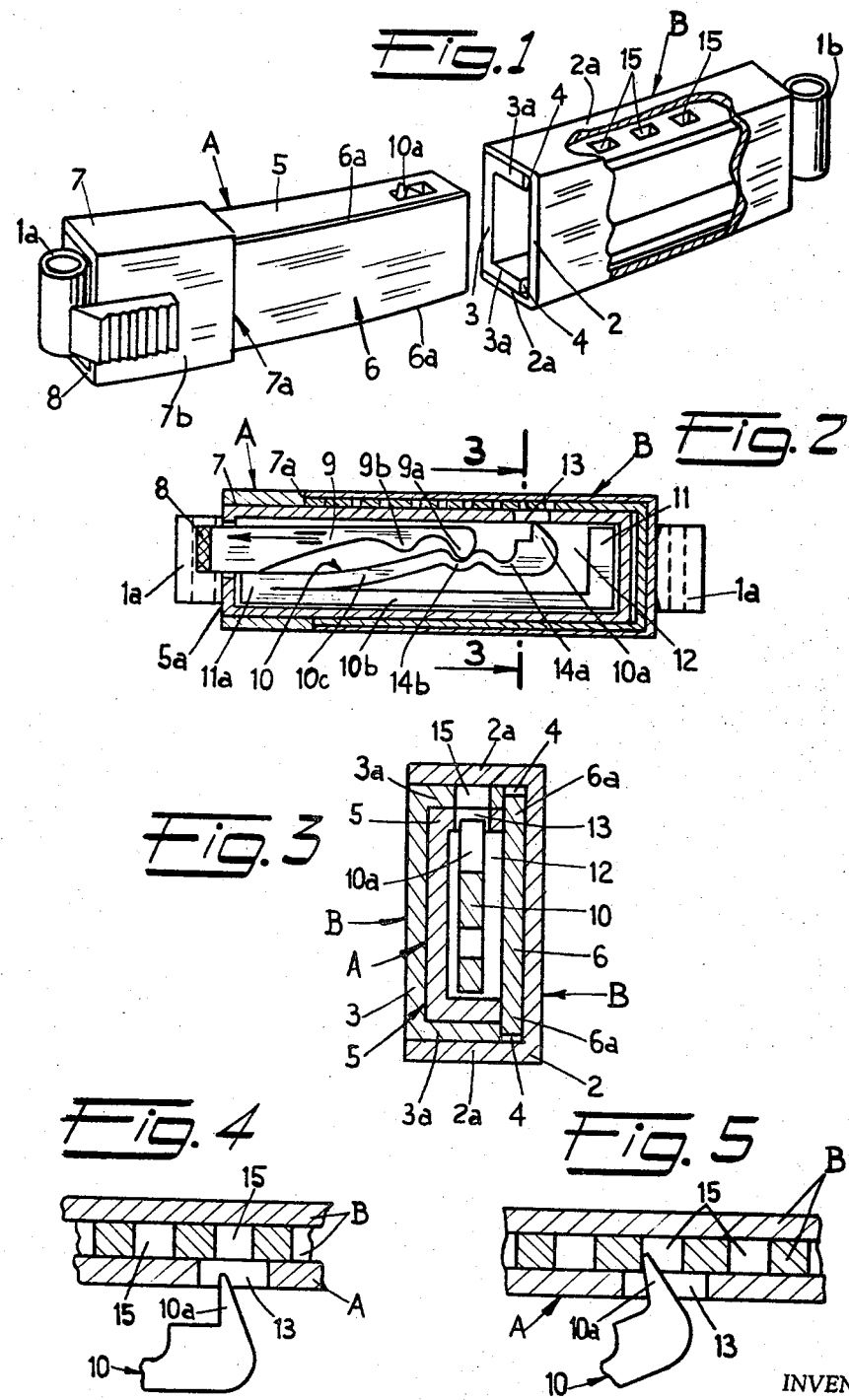

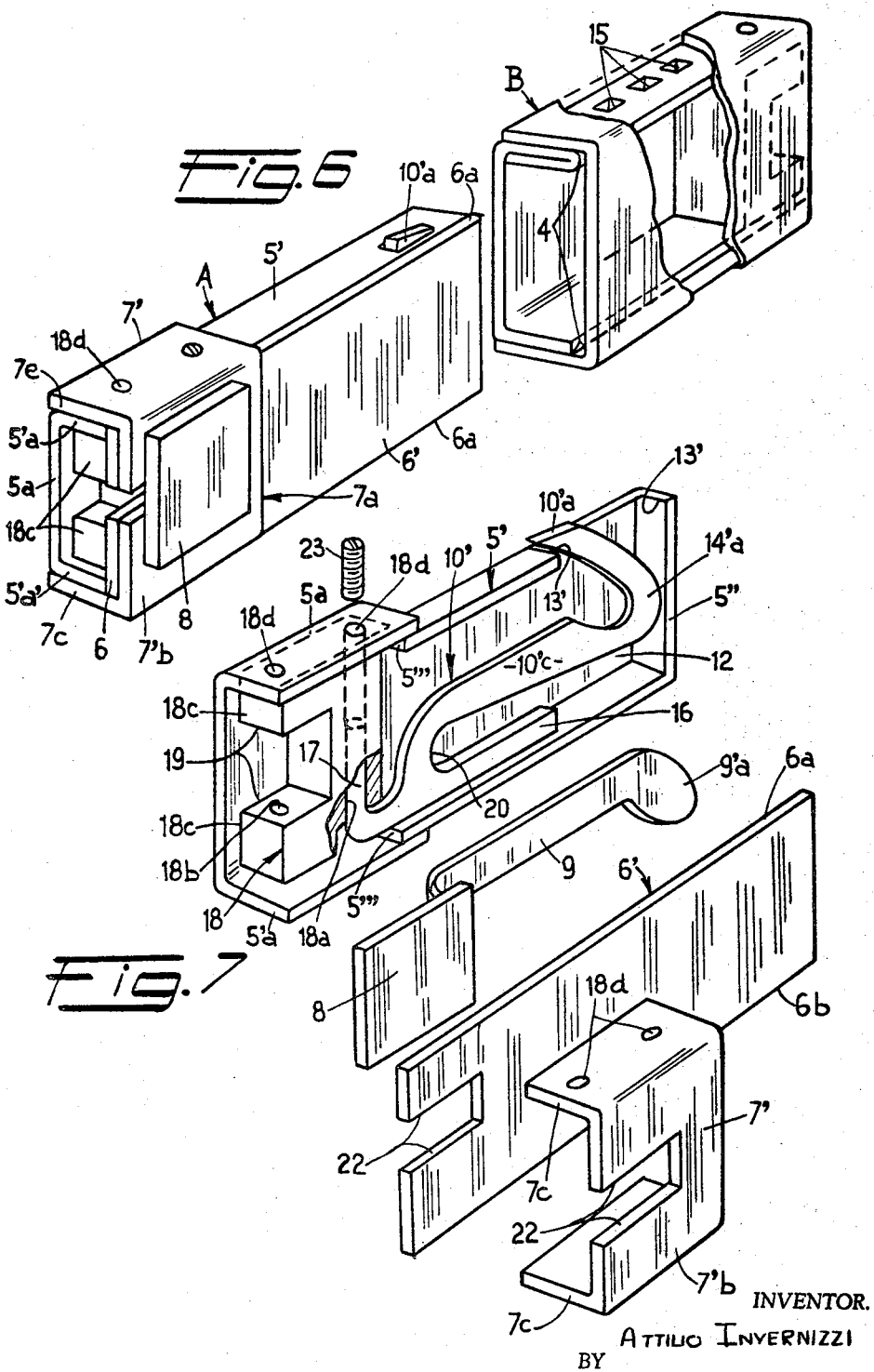

3,407,453
FASTENER FOR AN ARMLET, BRACELET OR WATCHBAND
Attilio Invernizzi, c/o F.lli de Dominicus, Via Brera 6, Milan, Italy
Filed June 17, 1966, Ser. No. 558,336
Claims priority, application Italy, June 24, 1965, 6,162/65
12 Claims. (Cl. 24—206)

ABSTRACT OF THE DISCLOSURE

A fastener for an article of personal adornment, such as an armlet, bracelet or watchband, which is composed of two parts. Each part is attached to a different free end of the armlet, bracelet or watchband. One part is an elongated plug and the other an elongated socket which matingly receives the plug. The plug has an external operator mounted thereon for movement in a direction axially of the plug. The plug also has a catch that is separate from the operator and is located inside the plug. The catch is supported on a cantilever spring in the plug, the catch being movable from a position retracted within the plug to a position in which it extends through an aperture in a side of the plug. The catch is arranged to be actuated by the operator. The socket has several interior openings in a side corresponding to the side of the plug through which the catch can protrude so that the catch can be received in any one of the openings and by manipulation of the operator can be shifted to a retracted position in which the plug can be pulled out of the socket.

---

The present invention relates to a fastener for armlets or bracelets, and for watchbands or straps in particular.

It is an object of the invention to simplify the structure of the said fastener or clasp for armlets or bracelets and for watchbands or straps in particular, and to arrange the said clasp in such manner that a bracelet for example, may be opened and closed very quickly, and may be easily and precisely adjusted to the thickness of the wrist or arm, with one hand in each instance, and that its mechanism does not stand proud of the said bracelet even if the latter is particularly thin.

The clasp according to the present invention is of the kind comprising two parts, one of plug or male type and the other of socket or female type, each said part being equipped at the appropriate end with devices for securing to the corresponding extremity of the said bracelet, whereas their other extremities are arranged for fitting into each other, the said clasp being characterized in that the said plug part is equipped with a device arranged for operation from the outside, by means of which a catch or the like may be made to project from one of its two longitudinal sides, for engagement in one of the corresponding notches, slots or the like, which are wrought within the corresponding side of the said socket part, so that the two said parts may be connected or disconnected.

In one form of embodiment, the two said parts have cross-sections of essentially rectangular shape and are of very flat form, the said plug element consisting of a unit of channel section and of a closing plate which projects slightly beyond its longitudinal sides and is intended for insertion into corresponding mating cavities within the said socket part, the latter being formed by two units of channel section inserted in one another with their bases turned outwards.

The invention will now be described with reference to the accompanying drawings, which show two forms of embodiment of the invention, but in no restrictive sense.

FIGURE 1 is an enlarged scale view in perspective of the said fastener or clasp, its two parts being separate.

FIGURE 2 shows a longitudinal section of the same scale, taken through the median plane parallel to the surfaces of maximum extension of the device in the closed position.

FIGURE 3 shows a cross-section, of even greater scale, taken through a plane abreast of the catch for locking the said two parts.

FIGURE 4 shows a detail with the said catch retracted, and the two said parts not being locked to each other.

FIGURE 5 shows the corresponding detail, with the said catch in the locking position.

FIGURES 6 and 7 illustrate a modified form of embodiment.

In FIGURES 1 to 5, the said plug part is marked A and the said socket part is marked B, the said parts having corresponding eyes or the like 1a and 1b for connection to the two ends of the said bracelet or the like, the latter not being illustrated in the drawings.

The socket part B, like the plug part A, has a very flat rectangular cross-section, and is formed of two units 2 and 3, both of channel section and with the narrower unit 3 inserted into the other unit 2 in such manner that between them they form a closed rectangular section. The sides 3a of the inner unit 3 are shorter than the corresponding sides 2a of the outer unit 2, in such manner as to form longitudinal cavities 4.

The plug part A comprises a hollow unit as apparent from FIGURES 1 and 3, its outer section matching the inner section of the unit B. The said hollow unit A comprises an element 5 of channel section closed off by a small plate 6 whereof the longitudinal edges 6a project slightly in such manner that these projections 6a engage in the corresponding cavities 4 within the part B with a sliding fit therein. At its extremity equipped with an operating device, the part A has an enlarged portion 7 whereof the face 7a forms an abutment for the corresponding extremity of the part B having identical outer dimensions. On the face 7b of the said enlarged portion 7, a push-button 8 for operating the locking device as such, is arranged to be freely slidable in the longitudinal direction. The said push-button 8 is made solid with a rod-like element 9 apparent from FIGURE 2, which is housed within the cavity 12 of the plug part A and is arranged for operation of the said locking device in order to connect or disconnect the two parts A and B. To this end, the element 9 is arranged to slide parallel to the geometrical axis of the said part A only, and its unconfined extremity appropriately has two projections 9a and 9b which are arranged for operation of the said locking device. The said locking device comprises a leaf or blade spring of V-shape, that is to say having two limb portions, and is marked 10. One of its limb portions has an extremity 10a shaped to form a catch or the like, whereas the other extremity 11 of the limb portion 10b of the said spring extends at right angles thereto and its size is such as to fit within the cavity 12 of the part A, thereby securing the spring 10 within the cavity 12.

The catch extremity 10a of the limb portion 10c which exerts a spring action, is arranged to lie within an opening 13 made in one side of the channel section unit 5 of the part A as apparent in FIGURE 4, or to project out of the said opening as apparent in FIGURE 5. Close to its unattached extremity, the said spring 10 has two concavities 14a and 14b, the first being deeper than the second, in which may be engaged the projections 9a and 9b of the small rod connected to the push-button 8. The said push-button 8 is arranged for longitudinal displacement in either direction with respect to the part A, as apparent from FIGURES 1 and 2. When the push-button 8 is displaced towards the left-hand side in the figures, the projection 9a of the small rod 9 engages in the concavity 14b of the spring portion 10c of the spring 10, thus displacing the portion 10c downwards in such manner that its extremity 10a is retracted into the opening 13 and that the said clasp is unlocked. When the push-button 8 is displaced towards the right-hand side however, the projections 9a and 9b are engaged in the corresponding concavities 14a and 14b. The concavity 14a being of greater depth, the limb portion integral with the said catch 10a is free to move away from the other limb, thus causing the said catch 10a to project from the part A, through the corresponding opening 13, and to engage in one of the cavities 15 arranged in a row within the part B, thus locking the clasp as apparent in FIGURE 5. In order to secure the spring 10 within the cavity 12, its extremity 11a may be soldered to the inner side of the extremity 5a of the unit 5 as apparent from FIGURE 2.

The shape of the elements 9 and 10, having corresponding projections and concavities, is such that the push-button 8 may be locked in stable manner in the two limiting positions illustrated. The row of notches 15 wrought within the part B moreover renders it possible to adjust the bracelet or the like to different wrist sizes.

In the modified form of embodiment according to FIGURES 6 and 7, the elements which remain unchanged bear the same references, the modified elements bear the same references but with marks of the close quote type, whereas new elements bear different references.

As apparent from FIGURE 7, the part A has housed within it a blade spring 10′ whereof the catch extremity 10′a is arranged to project out of the opening 13 made in the corresponding side of the said part A; as in the previously described form of embodiment. In this second form of embodiment, however, the spring 10′ is not secured by soldering like the extremity 11a of the spring 10.

According to this modified form of embodiment, the spring 10′ has a branch 16 bearing against the corresponding inner side within the cavity 12 of the unit 5 of the part A, and in extension of the said branch 16 has a projection 17 in the form of a peg or the like, which is bent over at right angle to the said branch 16. The said pin-shaped projection 17 is arranged in hinge-like manner in a corresponding seat or bearing 18a wrought in a small block 18. The said block 18 comprises devices for fastening to the corresponding end of the said bracket or the like. To this end, holes 18b are drilled through two corresponding projections 18c with a gap 19 between the latter, forming a median recess in the said small block 18, the said recess 19 being intended to receive the corresponding projection of the extremity of the said bracelet or the like, which is not illustrated.

When the said spring has been inserted, and the part A has been closed off by means of the small plate 6, the said spring is securely held in position.

The branch 16 need not therefore extend along the full length of the cavity 12, and since its end portion need not be secured by soldering, the resilient action of the said spring is not impaired by such subsequent application of heat.

The so-called release element 9′ is modified, and primarily so in respect, of its connection with the push-button 8. The said element 9′ has a bent portion 9″ which is joined to the inner side of the push-button 8. It is thus possible to bypass the said block 18 and to situate the element 9′ with its enlarged portion 9′a for operation in the same plane as that of the spring 10′.

In this form of embodiment, the element 9 has one enlargement only, corresponding to the sole concavity 14′a of the spring 10′, whereas the bend 20 separating the two said branches 10′c and 16, has a substantially greater radius of curvature than in the form of embodiment according to FIGURES 1 to 5.

The said plug part A primarily comprises four elements, being a channel section element 5′, with a closed extremity 5″, and an opening 13′ is a narrow side providing a passage for the spring catch extremity 10′a whereas the other extremity 5‴ is open and soldered or welded into an end piece 5a of channel section with its flange sections inserted between the wider flanges 7c of another end piece 7′ of corresponding section, the said element 5′ being closed off by a plate 6′ whereof one extremity is inserted into the open space between the two end pieces 5a and 7′, a notch 22 being wrought in the said extremity of the plate 6′ and in the front side 7′b of the end piece 7′ to provide a passage for the curved extremity 9″ of the rod 9′ intended to operate the locking device.

The small block 18 intended to anchor the spring 10′ is secured by means of a grub screw or the like 23 engaging in the corresponding screw thread cut in the extension of the hole 18b acting as a bearing or seat for the peg or pin 17 of the spring 10′, the channel section end pieces 5a and 7′ between which the said small anchoring block is situated, having holes 18d drilled in alignment with the holes 18a and 18b, providing a passage for the said grub screw 23, and for the anchoring pin of the corresponding end of the bracelet or the like.

The said socket part B remains unchanged except for incorporation of a small block 21 analogous in shape to the said block 18, to allow of connection of the other end of the said bracelet or the like.

Without a further analysis, what has been now shown, clearly demonstrates the concept of my invention which other people may readily adapt for various applications by using their normal capacities, without omitting the essential organs of the specific and general scope of this invention, so starting from already known applications; it is to be understood therefore that also some variations are included into the equivalent scope of the following claims.

What is claimed as new, and is desired to be protected with a patent, is as follows:

1. A fastener for detachably joining the extremities of an armlet, bracelet or watchband, said fastener including a hollow elongated plug part and a hollow elongated socket part, each part including means at its distal end for connection to a different extremity of the armlet, bracelet or watchband and the proximal end of the plug part, being matingly insertable into the adjacent end of the socket part, said plug part including an exposed operator, means mounting the operator on the plug part for manipulation in a direction axially of said part, a catch separate from the operator and located within the hollow of the plug part, cantilever spring means supporting the catch in the plug part for movement of a portion thereof between a position extended from one side of said plug part through an aperture in said plug part and a position retracted into said plug part, and means operatively connecting the operator to the catch so that manipulation of the operator in an axial direction moves the catch portion between its positions, the socket part having several interior openings in a side corresponding to said side of the plug part, said openings having side walls perpendicular to said side of the socket part, the catch portion in extended position protruding into any desired one of the openings and in retracted position being withdrawn from such opening, the catch portion in its extended position connecting said parts and in its retracted position disconnecting said parts.

2. A fastener as set forth in claim 1 wherein both said parts are of flat rectangular shape in cross-section, the plug part including a channel and a plate closing the channel, one wall of the channel having an opening for passage of the catch portion, the end of the channel nearest the extremity of the armlet terminating in a portion of enlarged section, said section abutting the socket part when the plug part is inserted into the socket part, said plate having oppositely outwardly projecting parallel side edges and the socket part having opposed cavities slidably receiving said side edges.

3. A fastener as set forth in claim 2 wherein the socket part comprises two elements, said elements being channel shaped in section, each element including a base wall and a pair of opposed parallel side walls, wherein means engages the elements with one another so that one element fits within the other element, the side walls of the outer element overlaying the side walls of the inner element and the base walls of the elements being parallel and opposed, the elements further defining between the edges of the side walls of the inner element and the base wall of the outer element the concavities to receive the side edges of the plate, the interior openings being arranged in a row in one of the side walls of the inner element.

4. A fastener as set forth in claim 1 wherein the plug part comprises four elements, the first element being of channel shaped section and including a base wall and side walls, the first element having one of its ends closed, having an opening in one of its side walls to permit passage therethrough of the catch portion, and having its other end open, the second element being of channel shaped section and including a base wall and side walls, means joining the first element at its open end to the second element so that the base walls of the elements are adjacent and so that the side walls of the first element are within the side walls of the second element, the third element being a plate closing the first two channel shaped elements, the plate having a notch in one end thereof to provide passage for the means operatively connecting the operator to the catch, the fourth element being of channel shaped section and including a base wall and side walls, and means joining the fourth element to the second element so that their respective base walls are parallel and spaced and the side walls of the fourth element overlay the side walls of the second element, the base wall of the fourth element having a notch in registry with the notch in the plate.

5. A fastener for detachably joining the extremities of an armlet, bracelet or watchband, said fastener including a hollow elongated plug part and a hollow elongated socket part, each part including means at its distant end for connection to a different extremity of the armlet, bracelet or watchband and the adjacent end of the plug part being matingly insertable into the adjacent end of the socket part, said plug part including an exposed operator, means mounting the operator on the plug part for manipulation, a catch located within the hollow of the plug part, means mounting the catch in the plug part for movement of a portion thereof between a position extended from one side of said plug part and a position retracted into said plug part, and means operatively connecting the operator to the catch so that manipulation of the operator moves the catch portion between its positions, the socket part having several interior notches in a side corresponding to said side of the plug part, the catch portion in extended position protruding into any desired one of the notches and in retracted position being withdrawn from such notch, the catch portion in its extended position connecting said parts and in its retracted position disconnecting said parts, both said parts being of flat rectangular shape in cross-section, the plug part including a channel and a plate closing the channel, one wall of the channel having an opening for passage of the catch portion, the end of the channel nearest the extremity of the armlet terminating in a portion of enlarged section, said section abutting the socket part when the plug part is inserted into the socket part, said plate having oppositely outwardly projecting parallel side edges and the socket part having opposed cavities slidably receiving said side edges, said catch constituting a spring element located within the plug part, the spring element including a limb portion with a free end, said free end constituting the catch portion, the means operatively connecting the operator to the catch comprising a rod and means mounting the rod for displacement axially of the plug part, the rod being fixed on one end to the operator, the other end of the rod constituting a cam projection, the projection as the rod moves contacting and moving said limb portion so that the catch portion moves between its positions.

6. A fastener as set forth in claim 5 wherein the spring element is V-shaped and has two limb portions, one of the limb portions bearing against an inner side of the plug part, the other limb portion being the limb portion with the free end and being resilient and having at least one concavity therein matable with the cam projection of the rod and wherein means fixes said one limb portion to the plug part.

7. A fastener as set forth in claim 6 wherein the resilient limb portion has two concavities, one of said concavities being deeper than the other concavity, the cam projection of the rod being seatable in either desired one of the concavities, the catch portion extending from the plug part when the projection is seated in the deeper concavity and the catch portion being retracted into the plug part when the projection is seated in the other concavity.

8. A fastener for detachably joining the extremities of an armlet, bracelet or watchband, said fastener including a hollow elongated plug part and a hollow elongated socket part, each part including means at its distant end for connection to a different extremity of the armlet, bracelet or watchband and the adjacent end of the plug part being matingly insertable into the adjacent end of the socket part, said plug part including an exposed operator, means mounting the operator on the plug part for manipulation, a catch located within the hollow of the plug part, means mounting the catch in the plug part for movement of a portion thereof between a position extended from one side of said plug part and a position retracted into said plug part, and means operatively connecting the operator to the catch so that manipulation of the operator moves the catch portion between its positions, the socket part having several interior notches in a side corresponding to said side of the plug part, the catch portion in extended position protruding into any desired one of the notches and in retracted position being withdrawn from such notch, the catch portion in its extended position connecting said parts and in its retracted position disconnecting said parts, the catch constituting a spring located within the plug part, said spring having three branches, the first branch having a free extremity which constitutes the catch portion, the second branch being situated against an inner side wall of the plug and supporting the spring and the third branch constituting an anchoring pin, a block, means fixing the block to one end of the plug part, said block in its interior side having a bore, said bore seating the anchoring pin, and the exterior side of the block including the means for connecting the plug part to an extremity of the armlet.

9. A fastener as set forth in claim 8 wherein the means operatively connecting the operator to the catch comprises a rod and means mounting the rod for displacement axially of the plug part, the rod being in one piece with the operator and being joined to the latter on the inner side of the operator, the rod having a free end situated in the plane of the first branch and abutting the first branch in its path of travel so as to move the catch portion between its positions.

10. A fastener as set forth in claim 9 wherein the first branch has a single cavity therein and the rod has a cam projection at the extremity thereof for selective cooperation with the cavity to move the catch portion between its positions.

11. A fastener as set forth in claim 8 wherein the second branch is shorter than the first branch and shorter than the plug part, the third branch being formed at a right angle to the second branch, said branches lying in the same plane.

12. A fastener as set forth in claim 8 wherein the plug part has an aperture therein in alignment with the bore in the block, a grub screw extending through said apertures and bore to anchor the third branch of the spring element, the plug part and the block having a pair of opposed aligned apertures to receive a pin for connection with a corresponding extremity of the armlet.

References Cited

UNITED STATES PATENTS

| | | |
|---|---|---|
| 794,098 | 7/1905 | Hainsfurther _____ 24—206 |
| 1,563,270 | 11/1925 | Fife. |
| 1,719,891 | 7/1929 | Kuhl. |
| 3,035,573 | 5/1962 | Morton. |
| 3,288,528 | 11/1966 | Board _____ 24—206 |

FOREIGN PATENTS

| | | |
|---|---|---|
| 554,458 | 1/1957 | Italy. |
| 90,771 | 9/1921 | Switzerland. |

BERNARD A. GELAK, *Primary Examiner.*